Figure 1:
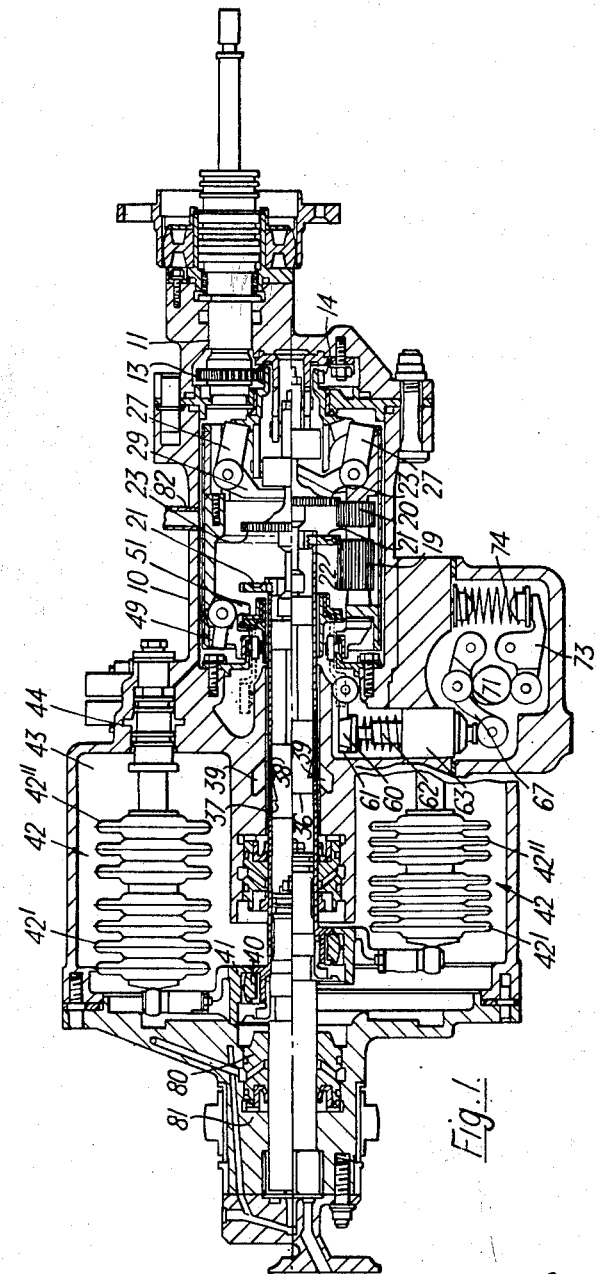

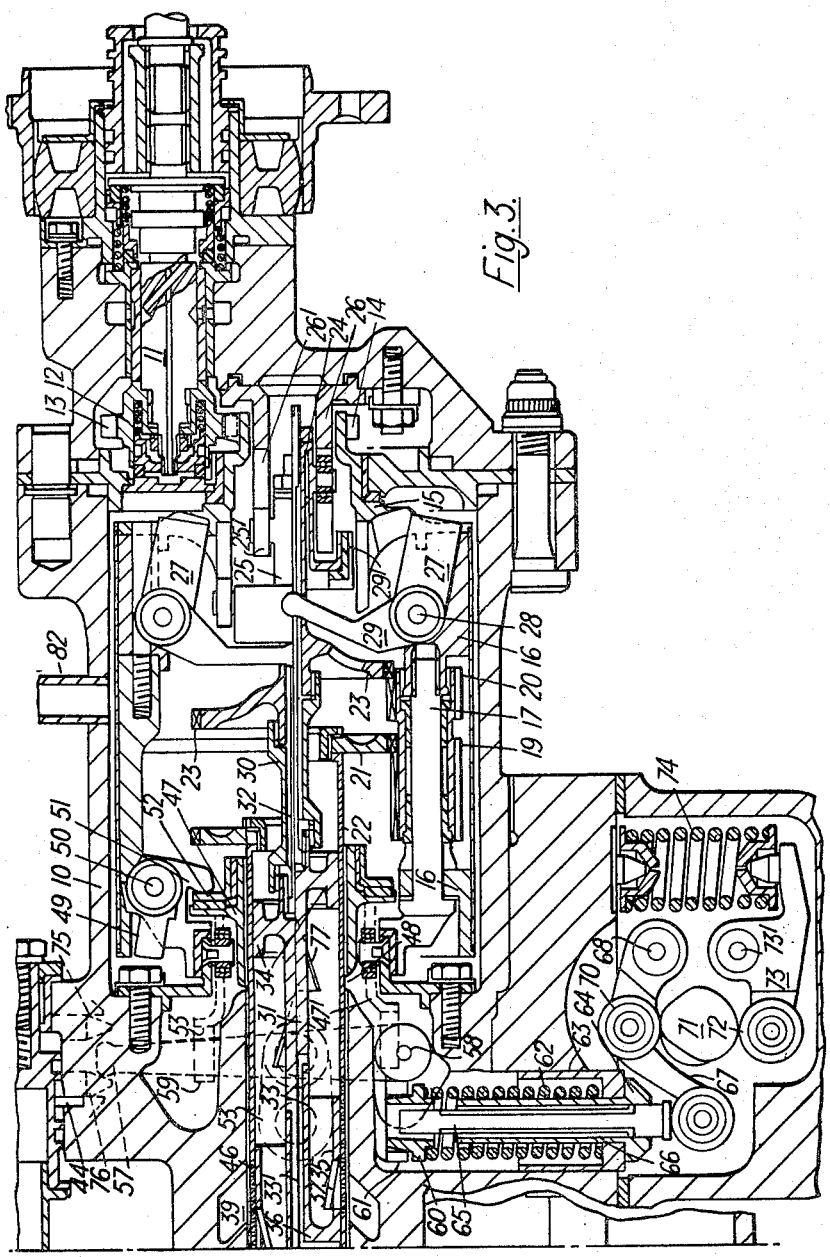

3,175,358
FUEL CONTROL FOR A GAS TURBINE ENGINE
Albert Jubb, Derby, Christopher Linley Johnson, Allestree, and William Ralph Coleman Ivens, Derby, England, assignors to Rolls-Royce Limited, Derby, England, a company of Great Britain
Filed May 4, 1962, Ser. No. 192,588
Claims priority, application Great Britain, May 5, 1961, 16,494/61
2 Claims. (Cl. 60—39.28)

This invention which concerns a gas turbine engine fuel system, is an improvement in or modification of the invention disclosed in U.S. patent applications Serial Nos. 750,177 now Patent No. 3,085,397 and 750,188 now Patent No. 3,091,925.

According to the present invention there is provided a gas turbine engine fuel system for controlling the supply of pressurised fuel from a source thereof to a burner of a gas turbine engine comprising a cylindrical metering device which is provided with a metering orifice, means for varying the size of the metering orifice in accordance with engine rotational speed and, independently, in functional relationship with the outlet and intake pressures of compressor means of the engine, and a throttle valve, mounted concentrically with respect to the cylindrical metering device, for controlling the fuel flow to the burner in accordance with the pressure drop across the metering orifice.

Preferably the throttle valve is mounted wholly within the cylindrical metering device.

It will be appreciated that by reason of the concentric mounting of the throttle valve and the cylindrical metering device, the fuel system may be given a smaller axial length and hence a smaller weight than the fuel system of U.S. patent applications Serial Nos. 750,177 now Patent No. 3,085,397 and 750,188 now Patent No. 3,091,925.

Preferably the cylindrical metering device comprises two concentric cylindrical apertured portions, the apertures in which cooperate to provide the said metering orifice, the means for varying the size of the metering orifice effecting relative axial movement of the apertured portions.

Means are preferably provided for effecting relative rotation of said apertured portions, whereby to diminish the risk of their sticking to each other.

Preferably one of the said apertured portions is in two spaced parts one part of which is axially adjustable by means responsive to engine rotational speed, the other apertured portion being axially adjustable by means responsive to a pressure or pressures having the said functional relationship.

The throttle valve preferably has a piston portion which is slidably mounted within the inner apertured portion of the cylindrical metering device, the piston portion having oppositely disposed pressure faces which are respectively open to the pressures immediately upstream and downstream of the metering orifice.

The throttle valve may have a port therein through which fuel may flow to a passage leading to the burner, the inner apertured portion of the cylindrical metering device having a plurality of openings therein through which the fuel passes in flowing from the throttle valve to the said passage.

Means are preferably provided for preventing rotation of the throttle valve, the inner apertured portion of the cylindrical metering device being drivingly connected to a rotatable housing which is adapted to be driven by the engine, the housing carrying a centrifugal governor which is arranged to effect axial adjustment of a part of the outer apertured portion of the cylindrical metering device.

The housing preferably carries a second centrifugal governor which is arranged to effect axial leading of the throttle valve.

Preferably the housing is drivingly connected to the inner apertured portion of the cylindrical metering device by a partial epicyclic gear which does not incorporate an annulus gear.

Figure 2:
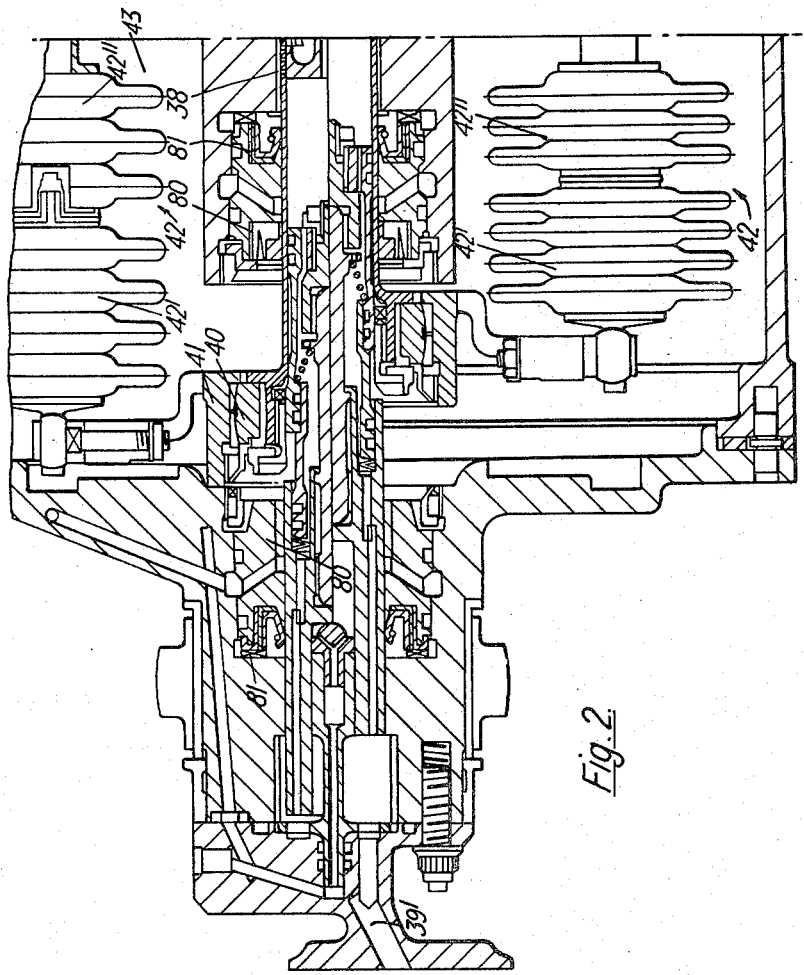

The invention is illustrated, merely by way of example, in the accompanying drawings, in which:

FIGURE 1 is a longitudinal section through a gas turbine engine fuel system according to the present invention, the upper and lower halves of the section showing the parts thereof in different positions, and FIGURES 2 and 3 respectively show different parts of the structure of FIGURE 1 on an enlarged scale.

The terms "left" and "right" as used in the descriptions below are to be understood to refer to directions as seen in the drawings.

Referring to the drawings, a gas turbine engine fuel system comprises a fuel control unit having a body 10. Rotatably mounted within the body 10 is a shaft 11 which is driven (by means not shown) from the engine at a speed which is a fixed proportion of engine speed.

Splined onto the left hand end of the shaft 11 is a sleeve member 12 which is provided circumferentially with gear teeth 13. The gear teeth 13 mesh with gear teeth 14 which are provided circumferentially at the right hand end of a sleeve member 15.

The sleeve member 15 is drivingly connected to a rotatably mounted cylindrical cage 16. The cylindrical cage 16 carries three planet gear pins 17 of which only one is shown in the drawings. Rotatably mounted on each of the pins 17 is a compound planet gear 19, 20 of which the gear 20 has the same number of teeth, but a larger pitch circle, than that of the gear 19.

The gear 19 mesh with a rotatable sun gear 21 which is mounted at the right hand end of an axially movable and rotatable sleeve 22. The sleeve 22 is preferably a thin-walled construction, e.g. of a radial thickness of 0.080", and is slidably mounted in the body 10.

The gears 20 mesh with a non-rotatable sun gear 23 which is mounted for axial sliding movement. The non-rotatable sun gear 23 is secured to an axially movable shaft 24 whose right hand end is secured to a sleeve member 25. The sleeve member 25 is provided with three ball races 25' which are angularly spaced from each other by 120° and which are mounted in axially elongated slots 26' in a sleeve 26 which is secured to the body 10. This construction permits axial movement of the sun gear 23 whilst preventing rotation thereof.

The gears 19, 20 are of considerable axial length to ensure that, during axial movement of the sun gears 21, 23, the latter will remain in mesh with the gears 19, 20.

The sun gear 23 is allowed to float off centre so as to accommodate errors in the spacing of the planet gear pins 17.

The compound planet gears 19, 20 and sun gears 21, 23 constitute a partial epicyclic gear which does not employ an annulus gear. The partial epicyclic gear may be such as to transmit rotation from the shaft 11 to the sleeve 22 at a reduction ratio within the order of 10:1 to 15:1 so that, when the engine speed is at its maximum, the sleeve 22 may be rotated at a speed of the order of, say, 400 r.p.m.

Mounted within and carried by the cage 16 are centrifugal flyweights 27 forming part of an acceleration control governor 28. The flyweights 27, which may be made of aluminium, have arms 29 which act through a thrust bearing 29' to adjust the axial position of the sun gear 23.

Opposite ends of an axially movable hollow quill shaft 30 are respectively splined to the non-rotatable sun gear 23 and to a throttle valve 31, the throttle valve 31 being slidably mounted within the sleeve 22. A bendable tension member 32 (e.g. a piano wire) is provided to connect the throttle valve 31 with the non-rotatable sun gear 23. The arrangement is thus such that the throttle valve 31 may be moved axially within the sleeve 22 but is prevented from rotating therein, some lateral movement of the sun gear 23 with respect to the throttle valve 31 being permitted without breaking the connection therebetween.

The throttle valve 31 has a stem 33 at whose right hand end there is a piston 34 which slidably engages the sleeve 22. The throttle valve 31 has, at its left hand end a skirt 35 which is connected to the stem 33 by a wall forming a piston 36, the piston 36 slidably engaging the sleeve 22.

The stem 33 has an axially extending drilling 33' therein which communicates with opposite sides of the piston 36 so as to pressure balance the latter.

The skirt 35 has ports 37 therein which are adapted to communicate, via radial drillings 38 in the sleeve 22, with a fuel passage 39 which leads to the main burners (not shown) of the gas turbine engine. Accordingly the flow through the fuel passage 39 will be adjusted by the setting of the throttle valve 31 and hence by the acceleration control governor 28.

Fuel may also flow (by means not shown in detail) from the interior of the sleeve 22 to a fuel passage 39' and so to the pilot burners (not shown) of the engine.

The sleeve 22 carries a spherical bearing 40 which supports a housing 41. The housing 41 is axially adjustable in position by a pair of acceleration control capsules 42 which are disposed on diametrically opposite sides of the sleeve 22 and which are mounted within a common chamber 43.

Each capsule 42 is divided into two compartments 42', 42" of which the compartments 42' are evacuated. The compartments 42" are open, by means not shown in detail, to a duct 44 which is supplied (by means not shown) with air at a pressure $P_1'$ which is the delivery pressure of the low pressure compressor (not shown) of the engine, the pressure $P_1'$ being of course functionally related to the pressure $P_1$ of the intake to the said low pressure compressor.

The chamber 53 communicates, by means not shown in detail, with a passage, also not shown. A conduit (not shown) has opposite ends which are respectively adapted to be supplied with air at the intake pressure $P_1$ of the low pressure compressor and air at the outlet pressure $P_2$ of the high pressure compressor, or with air at pressures functionally related to $P_1$ and $P_2$. The said conduit is provided with a pair of spaced restrictions therein and the said passage communicates with the space between said restrictions.

Accordingly, and as explained in detail in U.S. patent applications Serial Nos. 750,177 now Patent No. 3,085,397 and 750,188 now patent No. 3,091,925, the capsules 42 will effect axial adjustment of the sleeve 22 in direct proportion of $P_1F(P_2)/P_1$, F being the particular function employed.

The sleeve 22 is mounted concentrically within axially spaced sleeves 46, 47 of which the sleeve 46 is a fixed sleeve forming part of the body 10. Between the sleeves 46, 47 there is an annular gap 48.

Mounted within and carried by the cylindrical cage 16 are centrifugal governor flyweights 49 which form part of a top speed governor 50. The flyweights 49 have arms 51 which engage a radially extending flange portion 52 of the sleeve 47. Thus when the rotational speed of the engine exceeds a predetermined value, the sleeve 47 is forced towards the left so as to reduce the size of the annular gap 48.

The sleeve 47 is provided with an axial extension 47' having two axially facing abutment faces 53, each of which are engaged by a roller 59 carried on a forked lever 57. The lever 57 is pivotally mounted at 58 and carries an arm 61 at its lower end which bears against a tubular member 60. A spring 62 extends between the member 60 and a cup shaped member 63 which is mounted in the body 10 for sliding movement radially thereof.

The cup shaped member 63 supports a guide sleeve 64 within which is mounted a rod 65 one end of which, when the parts are disposed as shown in the drawing, is spaced from but is disposed close to the arm 61. The other end of the rod 65 is secured to the guide sleeve 64. The rod 65 incorporates temperature compensating tubes 66 which, when the fuel temperature changes, causes relative movement between the rod 65 and sleeve 64.

The end of the rod 65 remote from the arm 61 engages the outer end of a curved lever 67 which is pivoted at 68. The curved lever 67 has a centrally disposed roller 70 which is engaged by a cam 71 carried by a pilot's throttle lever (not shown). The cam 71 is engaged by a roller 72 carried by a lever 73 pivoted at 73', the lever 73 being urged by a spring 74 in a direction to reduce the torque required to operate the throttle lever.

It will therefore be appreciated that adjustment of the said pilot's throttle lever will adjust the loading on the spring 62 and will therefore adjust the speed at which the top speed governor 50 moves the sleeve 47 in a direction to reduce the size of the gap 48.

The temperature compensating tubes 66 are provided to compensate for the effects of the temperature of the fuel passing through the fuel system. If no temperature compensating means were provided, the speed obtained for any given setting of the said pilot's throttle lever would decrease as the temperature of the fuel increased. This is primarily because the stiffness and length of the spring 62 varies with temperature. The expansion of the temperature compensating tubes 66 is therefore chosen to cancel out the effect of the weakening and expansion of the spring 62 so that the speed at which the governors 50 start to close the gap 48 is not affected by fuel temperature.

Stops 75, 76, which are engageable with the lever 57, are provided to limit movement of the lever 57 during acceleration and deceleration respectively.

The sleeve 22 is provided with a number of slots 77 of triangular or other shape whose cross-section varies axially, the slot 77 being partially covered by the sleeves 46, 47. The slots 77 and gap 48 together constitute a main or metering orifice the size of which will vary on movement of the sleeves 22, 47 by the capsules 42 and governor 50 respectively.

The sleeve 22 is sealed, as indicated at 80, 81, to the body 10 in such a way as to prevent fuel from passing into the chamber 43, fuel being however permitted (by means not shown) to act on the opposite ends of the sleeve 22 so as to pressure balance it.

A duct 82 is provided to convey fuel from a tank (not shown) to the interior of the body 10, the duct incorporating a fuel pump (not shown).

The operation of the fuel system shown in the drawing is generally similar to that of U.S. patent applications Serial Nos. 750,177, now Patent No. 3,085,397, and 750,188, now Patent No. 3,091,925, and therefore will not be described in detail. Suffice it to say that the full flow of fuel pumped by the said fuel pump passes through the metering orifice 48, 77 and via the passages 39, 39' to the main and pilot burners. Thus in the fuel system shown in the drawing, pilot flows are not employed to operate servo valves which control the main flow. This is a feature of importance since servo valves tend to stick and require filtering of the fuel.

As the speed of the engine increases, the sleeve 22 will be moved towards the right by the capsules 42 whereby to increase the size of the parts of the slots 77 which are open to fuel flow. The size of the metering orifice will therefore depend in part on the value of $P_1F(P_2)/P_1$ and in part on engine rotational speed as applied by the governor 50 to the sleeve 47.

Increase of speed will also cause the governor 28 to move the throttle valve 31 towards the right whereby to increase the size of the parts of the ports 37 which communicate with the passage 39. The throttle valve 31 is urged towards the left by the pressure of the fuel within the cylindrical cage 16, this fuel being at the delivery pressure of the said fuel pump and acting on the right hand face of the piston 34. The throttle valve 31 is also, however, urged towards the right by the pressure of the fuel which has passed through the metering orifice 48, 77 into the interior of the sleeve 22 and which acts on the left hand face of the piston 34. Accordingly the setting of the throttle valve 31 will depend in part on engine rotational speed and in part on the pressure drop across the metering orifice 48, 77.

Both the capsules 42 and the governor 28 will therefore serve to control the acceleration of the engine. When however, the engine has reached the speed selected by the setting of the pilot's throttle lever, the governor 50 will move the sleeve 47 so as to reduce the size of the gap 48 and therefore prevent the selected speed being exceeded.

The relative rotation between the sleeve 22 and the sleeves 46, 47 and throttle valve 31 diminishes the risk that dirt will cause these members to stick to each other and so prevent relative axial movement thereof.

We claim:
1. A gas turbine engine fuel system for controlling the supply of pressurized fuel from a source thereof to a burner of a gas turbine engine comprising a cylindrical metering device, said device comprising a pair of apertured cylindrical members axially mounted the one within the other for relative axial movement, the outer cylindrical member having two axially aligned spaced parts which are relatively movable in an axial direction to vary the space between the two respective parts, thus forming the aperture in the outer cylindrical member, a metering orifice formed by the cooperating apertures in the two cylindrical members, means for varying the size of the metering orifice in accordance with engine rotational speed, said means comprising a centrifugal governor connected to a movable cylindrical part of the outer cylindrical member and actuated by the engine rotational speed to vary the space between the two relatively movable parts and the aperture formed thereby, means responsive to the engine throttle setting to vary the speed at which the centrifugal governor moves the movable cylindrical part of the outer cylindrical member, said means responsive to the engine throttle setting including a spring drive means and a temperature compensating member sensitive to fuel temperature to vary the effect of said drive means in order to compensate for mechanical changes in the said engine throttle setting responsive means developed by fuel temperature change; means for varying the metering orifice in functional relationship with the outlet and intake pressures of the compressor means of the engine, a throttle valve for controlling the fuel flow in accordance with the fuel pressure drop across the metering orifice and in response to rotational speed of the engine, a second centrifugal governor connected to said throttle valve and activated by the engine rotational speed to vary the position of the throttle valve, the throttle valve being slidably mounted with the inner apertured member of the cylindrical metering device, said valve having a piston portion having oppositely disposed pressure faces respectively open to the pressures immediately upstream and downstream of the metering orifice, and means providing relative rotation between the throttle valve, the inner and outer cylindrical members of the cylindrical metering device.

2. The invention as described in claim 1 and wherein the inner cylindrical member has a plurality of holes adapted for selective registration with a fuel passageway leading to the burner and the throttle valve piston has wall portions which slidably ride on the inner surface of the inner cylindrical member of the cylindrical metering device, said wall portion having openings registering with the metering orifice and the plurality of holes in the inner cylindrical member to provide controlled fuel flow between the metering orifice and the holes in the inner cylindrical member.

References Cited by the Examiner
UNITED STATES PATENTS

| | | | |
|---|---|---|---|
| 2,867,268 | 1/59 | Brown | 60—39.28 |
| 3,018,622 | 1/62 | Werts | 60—39.28 |
| 3,032,986 | 5/62 | Wright | 60—39.28 |
| 3,076,311 | 2/63 | Johnson | 60—39.28 |
| 3,085,397 | 4/63 | Jubb | 60—39.28 |
| 3,091,925 | 6/63 | May | 60—39.28 |

SAMUEL LEVINE, *Primary Examiner.*

ABRAM BLUM, *Examiner.*